United States Patent [19]

Morez

[11] Patent Number: 4,473,784

[45] Date of Patent: Sep. 25, 1984

[54] POWER CONTROL CIRCUIT

[76] Inventor: Gene S. Morez, 5701 W. Warren, Morton Grove, Ill. 60053

[21] Appl. No.: 474,784

[22] Filed: Mar. 14, 1983

[51] Int. Cl.³ .................. H02K 13/14; H02M 7/02
[52] U.S. Cl. .................................. 318/439; 318/341; 318/599; 318/333; 318/334; 318/349; 363/124; 363/127; 363/129; 307/125; 307/127; 307/130
[58] Field of Search .............. 318/439, 345 R, 345 A, 318/345 C, 345 CA, 345 AB, 345 B, 345 D, 345 E, 345 F, 345 G, 345 H, 244, 245, 301, 332, 341, 333, 349, 334; 363/124, 126, 127, 128, 131, 132, 133, 136, 137; 307/125, 127, 130

[56] References Cited

U.S. PATENT DOCUMENTS

| | | | |
|---|---|---|---|
| 3,466,522 | 9/1969 | Cushing, Jr. | 318/345 G X |
| 3,546,555 | 4/1968 | Morgan et al. | 318/341 |
| 3,739,198 | 6/1973 | Clements | 318/345 D X |
| 3,792,330 | 2/1974 | Ottoson | 318/269 |
| 3,855,511 | 12/1974 | Smith | 318/345 B X |
| 4,039,913 | 8/1977 | Clegg | 318/345 C |
| 4,202,032 | 5/1980 | Morez | 318/349 |

OTHER PUBLICATIONS

Operational Amplifiers (2nd Edition) by G. B. Clayton, Butterworth Scientific.

Primary Examiner—J. V. Truhe
Assistant Examiner—Paul Shik Luen Ip

[57] ABSTRACT

A circuit for controlling the power delivered to a load from an alternating current source includes a bridge rectifier coupled to the alternating current source for developing full and half-wave rectified signals in response thereto. The full and half-wave rectified signals are algebraically added to form a reference signal which is applied to one input of a comparator, the other input comprising an adjustable direct current control signal. The output of the comparator comprises a pulse width modulated signal which is used to control the state of a switching transistor connected in series with the load between the rectifier node developing the full-wave rectified signal and a point of reference potential.

11 Claims, 8 Drawing Figures

POWER CONTROL CIRCUIT

BACKGROUND OF THE INVENTION

The present invention relates generally to power control circuits and specifically concerns a circuit for controlling the power delivered to a universal direct current motor.

Many driven devices including universal direct current motors currently available on the market incorporate a very inexpensive design typically characterized by a minimum number of magnetic poles, high rotational friction and mechanical binding due to gear ratio-ing mechanisms. Due to these inherent design deficiencies most such driven devices have a relatively poor low voltage response and therefore will not operate smoothly at low speeds. In addition to the operational limitations imposed on such driven devices as a result of the aforementioned inherent design deficiencies, the control apparatus used to deliver power to the device can also influence its operation for the better or worse.

A typical prior art control apparatus for delivering power to a universal direct current motor comprises a bridge rectifier or the like for providing an unfiltered half or full-wave rectified signal whose amplitude is controlled by a variable resistance to increase or decrease the response of the driven device. U.S. Pat. No. 4,202,032, for example, discloses a power controller wherein the half and full-wave rectified signals are combined prior to being applied to the driven device. Power control circuits of this type, although inexpensive to manufacture and while providing for better operation than a controlled pure direct current voltage, are nevertheless unsatisfactory for insuring smooth performance of the driven device.

Power control circuits of the foregoing type typically include a variable resistance in the form of a rheostat to minimize power dissipation. Consequently, there is a point near the minimum operational range when the circuit is "open" thereby limiting the range of control over the driven device. Slow speed performance in response to such power control circuits is further aggravated by the resistance of the control circuit relative to that of the driven device.

Attempts to improve upon the performance of such prior art power control circuits have included the use of transistors as current amplifiers to allow for full range operation. However, the high power dissipation associated with these circuits requires the use of relatively large heat sinks to prevent damage to the transistors. Also, the voltage loss across the transistor, typically on the order of 1.5 to 2.5 volts, can be a relatively large percentage of the total voltage available to the control circuit.

Other circuits have been developed which rely on phase techniques for controlling the power delivered to the driven device. These circuits overcome some of the heat dissipation problems associated with the transistor control circuits but other problems are encountered. In particular, the phase control is typically implemented by silicon controlled rectifiers which supply extremely fast risetime pulses to the driven device resulting in excessive heating and premature failure of the driven device. It is known to connect capacitors across the output of the control circuit in order to reduce the risetime of the output pulses, but such capacitors also have the tendency to degrade the phase control operation of the circuit. Further, the voltage drop across the silicon controlled rectifier may be in excess of 1.2 volts which is still a relatively large percentage of the control circuit supply voltage.

It is accordingly a general object of the present invention to provide an improved power control circuit for controlling the power delivered to a driven device such as a universal direct current motor.

It is a more specific object of the invention to provide a power control circuit which will provide a complete range of control voltages for smoothly operating the driven device from full "off" to full "on".

It is a further object of the invention to provide a power control circuit of the foregoing type which minimizes heat build-up and power loss both in the control circuit itself and in the driven device.

BRIEF DESCRIPTION OF THE DRAWINGS

The invention, together with its objects and the advantages thereof, may best be understood by reference to the following description taken in conjunction with the accompanying drawings in which.

DESCRIPTION OF THE PREFERRED EMBODIMENT

Figure 1:
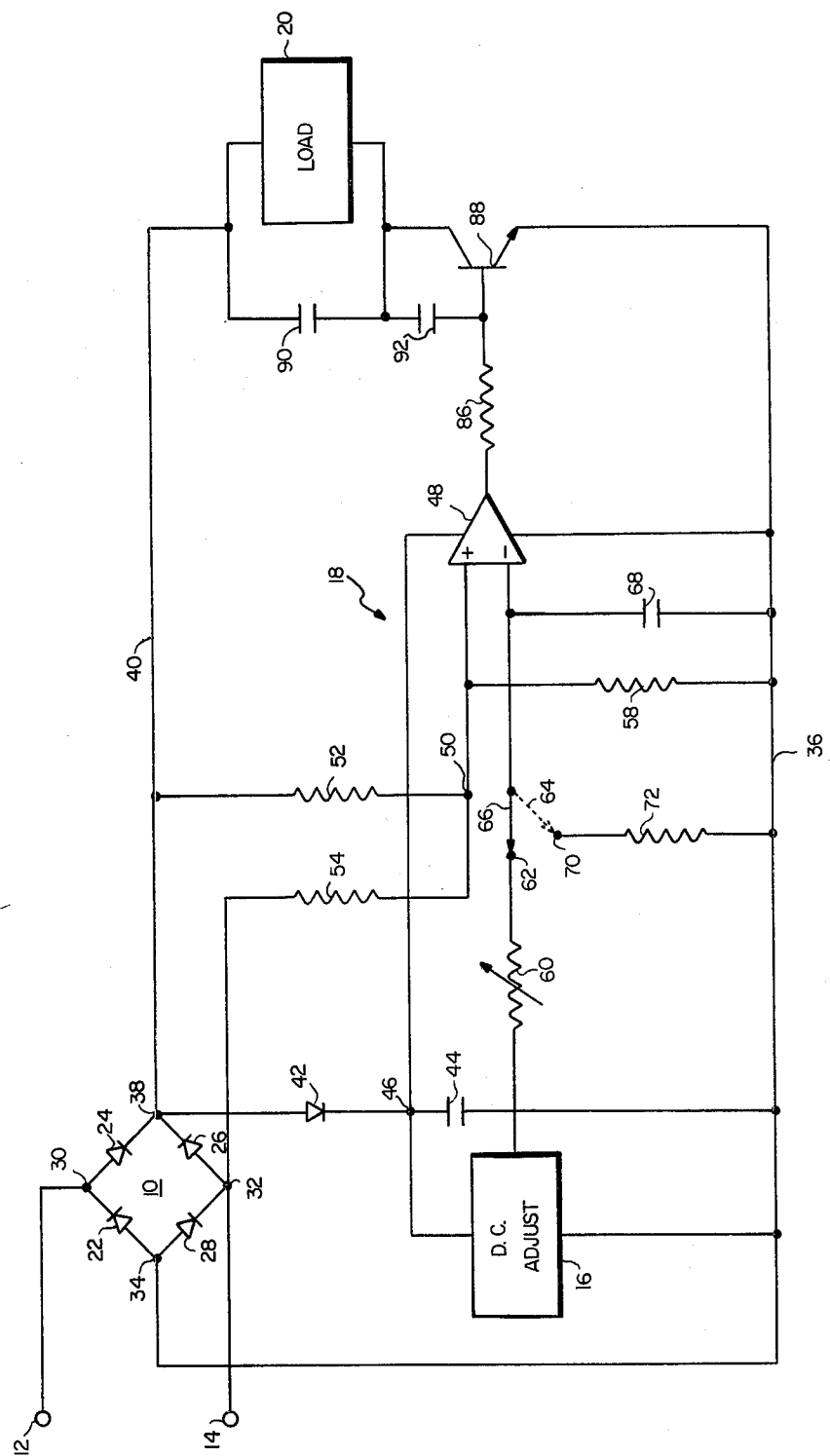
FIG. 1 is an electrical schematic diagram illustrating a presently preferred embodiment of the invention.

Referring to the drawings, FIG. 1 schematically illustrates a presently preferred embodiment of the power control circuit of the invention. The circuit essentially includes a bridge rectifier 10 responsive to an input alternating current power signal developed at a pair of input terminals 12 and 14, a manually operable circuit 16 for providing an adjustable direct current voltage, a control circuit 18 and a driven device 20 which may comprise a universal direct current motor or the like. As will be explained in further detail hereinafter, the control circuit 18 is operable for delivering power to the driven device 20 in the form of a pulse width modulated signal which is synchronized with the input alternating current signal and which is characterized by a duty cycle determined according to the relationship between the adjustable direct current voltage developed by circuit 16 and a reference signal comprising a mixture of half and full-wave rectified components of the input alternating current power signal.

Figure 2A:
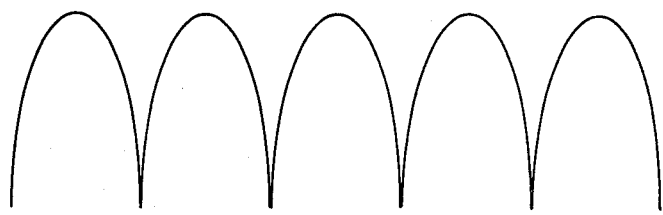
FIGS. 2A-2G illustrate various signal waveforms useful in explaining the operation of the circuit of FIG. 1.
Figure 2B:
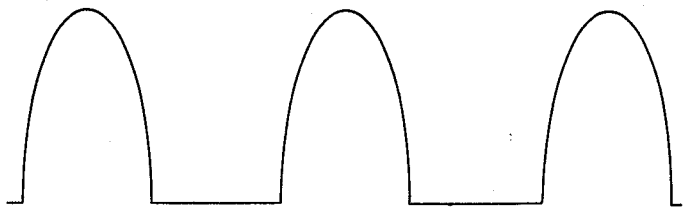

More specifically, bridge rectifier 10 will be seen to comprise a conventional bridge arrangement having four legs each of which includes a respective rectifying diode 22, 24, 26 and 28. A first mode 30 formed between diodes 22 and 24 is connected to input terminal 12 while a second node 32 formed between diodes 26 and 28 is connected to input terminal 14. A third node 34 of bridge rectifier 10 is coupled to a circuit return conductor 36 and a fourth node 38 is coupled to one input of the driven device 20 by a conductor 40. A full-wave rectified representation of the input alternating current signal (see FIG. 2A) is developed at node 38 and a half-wave rectified representation thereof (see FIG. 2B) is developed at node 32.

Figure 2C:
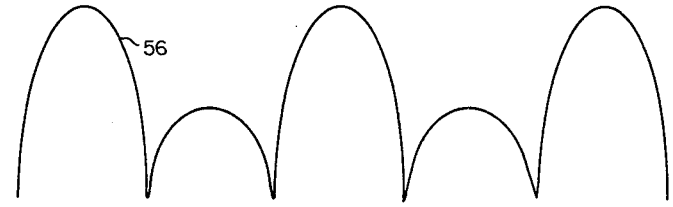

A diode 42 and a filter capacitor 44 are connected in series between full-wave rectifying node 38 and the return conductor 36 for developing an isolated direct current voltage at a node 46 formed therebetween. The direct current voltage developed at node 46 is used as a source of bias potential for circuit 16 and for an operational amplifier comparator 48 of control circuit 18, both circuit 16 and comparator 48 also including outputs coupled to the return conductor 36. The full-wave rectifying node 38 is further connected to a summing node 50 by a resistor 52, the summing node also being connected to the half-wave rectifying node 32 of bridge rectifier 10 by a resistor 54. Node 50 thereby develops a signal 56 (see FIG. 2C) reflecting the algebraic sum of the full and half-wave rectified components developed at nodes 38 and 32 respectively, this combined signal being applied to the non-inverting or reference input of operational amplifier comparator 48 through a resistor 58.

The adjustable direct current voltage developed at the output of circuit 16 is applied through a variable resistor 60 to the normally closed pole 62 of a switch 64. The wiper 66 of switch 64 is connected to the inverting input of comparator 48 through a capacitor 68. A normally open pole 70 of switch 64 is connected by a resistor 72 to the return conductor 36. As shown in FIG. 1, switch 64 is in its normal operating mode for providing a current path to charge or discharge capacitor 68 in response to the direct current voltage developed at the ouptut of circuit 16 for supplying a selected direct current voltage to the inverting input of comparator 48. An alternate discharge path for capacitor 68 may be effected by moving the wiper of switch 64 from its normal operating mode position so as to engage pole 70 and thereby connecting resistor 72 across the capacitor.

Figure 2D:
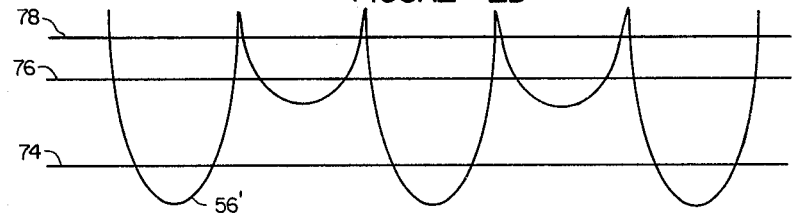
Figure 2E:
Figure 2F:
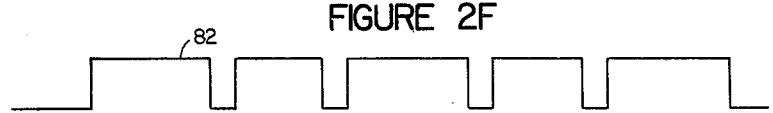

The operation of comparator 48 is most clearly depicted by the waveforms of FIGS. 2D–2F. It will be recalled that the non-inverting input of comparator 48 is supplied with a reference signal formed by algebraically adding the full and half-wave rectified components of the input alternating current signal developed at nodes 38 and 32 respectively which is represented by the inverted waveform 56' of FIG. 2D. The inverting input of the comparator, on the other hand, is supplied with a variable direct current signal in accordance with the setting of circuit 16. Comparator 48 is operable for comparing the signals supplied to its inverting and non-inverting inputs and for developing a high output whenever the direct current signal applied to its non-inverting input exceeds the instantaneous level of the reference signal 56' applied to its inverting input. On the other hand, a low output signal results from the comparator when the direct current signal is less than the instantaneous level of the inverted reference signal 56'.

Figure 2G:
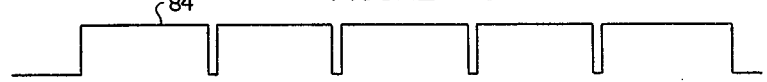

By way of example, three horizontal lines 74, 76 and 78 are superimposed over waveform 56' in FIG. 2D. These horizontal lines are intended to represent three different levels of the adjustable direct current signal supplied to the inverting input of comparator 48. Horizontal line 74 represents a relatively low direct current voltage level which intersects only the half-wave rectified component of inverted reference signal 56'. As a result, a relatively low duty cycle signal 80 (see FIG. 2E) is developed at the ouptut of the comparator. As the level of the direct current signal increases in amplitude a wider portion of the half-wave rectified component of non-inverted reference signal 56' will be intersected producing an increased duty cycle output signal. As the level of the direct current signal increases further both the half and full-wave rectified components of the non-inverted reference signal are eventually intersected as in the cases of horizontal lines 76 and 78. The direct current level represented by horizontal line 76 provides the increased duty cycle signal represented by waveform 82 of FIG. 2F while the direct current level represented by horizontal line 78 provides the nearly direct current output represented by waveform 84 of FIG. 2G.

It will thus be appreciated that comparator 48 provides a pulse width modulated signal at its output whose duty cycle varies smoothly in accordance with the setting of circuit 16 between a minimum or zero level and a maximum or direct current level. And, since this pulse width modulated signal is a function of both the amplitude and phase of the reference signal 56, it will always be in sync with the input alternating current signal so that the establishment of proper timing will not be phase dependent upon any capacitive circuits, but will always follow the input signal.

The pulse width modulated output of comparator 48 is applied through a current limiting resistance 86 to the base of an output transistor 88. The collector-emitter circuit of output transistor 88 is connected in series with the driven device 20, the series combination being connected between return conductor 36 and the full-wave rectifying node 38 via conductor 40. Therefore, when output transistor 88 is in conduction (due to a high level signal at its base) current will flow through the driven device 20 and be returned to conductor 36 through the collector-emitter circuit of output transistor 88. When output transistor 88 is cut-off (due to a low level signal at its base) no current will flow through the driven device. It will therefore be seen that an energizing current will be established through the driven device which is in precise timed relationship with the pulse width modulated signal developed at the output of comparator 48. That is, the energizing current will flow through the driven device when the pulse width modulated signal is high and will not flow when the signal is low. The amount of power delivered to the driven device is therefore dependent upon the duty cycle of the pulse width modulated signal which, in turn, is dependent upon the operator setting of adjustment circuit 16.

A capacitor 90 is preferably connected in parallel with driven device 20 as shown. Capacitor 90 provides a smoothing effect on the current delivered to driven device 20 by slowing the switching risetimes encountered when output transistor 88 is switched into its conducting state. Capacitor 90 also allows for a higher average voltage to be developed across driven device 20 by charging toward the peak voltage of the full-wave rectified signal developed at node 38. A further function of capacitor 90 is to suppress noise which may be generated by the driven device 20.

A further capacitor 92 is preferably connected between the driven device and the base of output transistor 88. This capacitor provides a feedback path which tends to prevent spurious oscillations of the output transistor and further reduces any transients which may occur as the result of any inductance in the driven device.

While particular embodiments of the invention have been shown and described, it will be obvious to those skilled in the art that changes and modifications may be made without departing from the invention in its broader aspects. For example, it will be appreciated that the inverting and non-inverting inputs of comparator 48 could be reversed with a corresponding reversal in the sense of the direct current control voltage being required to deliver equivalent power levels. Also, the polarity of output transistor 88 could be reversed whereby power would be delivered to the load in response to the low levels of the pulse width modulated output of comparator 48. The aim, therefore, in the appended claims is to cover all such changes and modifications as fall within the true spirit and scope of the invention.

What is claimed:

1. A circuit for controlling the power delivered to a load from an alternating current source comprising:
    means responsive to the alternating current source for developing a full-wave rectified reference dignal comprising a succession of half-cycle segments whose peak amplitudes alternate between first and second values;
    control means for generating an adjustable direct current control signal;
    means for developing a pulse width modulated signal having a first level whenever the level of the control signal exceeds the instantaneous level of the reference signal and otherwise having a second level; and
    output means responsive to one of the first or second levels of the pulse width modulated signal for connecting the load in circuit with the full-wave rectified reference signal developing means.

2. A power control circuit according to claim 1 wherein said reference signal developing means comprises a bridge rectifier having first and second nodes for developing full and half-wave rectified signals respectively in response to the alternating current source, and further including means for algebraically adding the full and half-wave rectified signals for developing said reference signal.

3. A power control circuit according to claim 2 wherein said output means comprises switching means responsive to said pulse width modulated signal, the switching means and the load being connected in series between said full-wave rectifying node and a point of reference potential.

4. A power control circuit according to claim 3 wherein said pulse width modulated signal developing means comprises a comparator for comparing the reference and adjustable direct current control signals for developing said pulse width modulated signal.

5. A power control circuit according to claim 4 including a signal smoothing capacitor connected in parallel across the load for reducing the switching risetimes introduced by the switching means.

6. A power control circuit according to claim 5 including an isolating diode and a first capacitor connected in series between the full-wave rectifying node and the point of reference potential for developing a biasing signal for biasing the control means and the comparator.

7. A power control circuit according to claim 6 wherein the comparator comprises a first input for receiving the adjustable direct current control signal from the control means and including a second capacitor connected between the first input and the point of reference potential and a switch means selectively operable for establishing a discharge path for the second capacitor.

8. A circuit for controlling the power delivered to a load from an alternating current source comprising:
    bridge rectifier means coupled to the alternating current source and having first and second nodes for developing full and half-wave rectified signals respectively in response thereto;
    means for algebraically adding the full and half-wave rectified signals for developing a reference signal;
    control means for generating an adjustable direct current control signal;
    means for comparing the reference and control signals for developing a pulse width modulated signal having a first level whenever the level of the control signal exceeds the instantaneous level of the reference signal and otherwise having a second level;
    switching means responsive to one of the first or second levels for assuming a conductive state and responsive to the other of said levels for assuming a non-conductive state, the switching means and the load being connected in series between the full-wave rectifying node and a point of reference potential.

9. A power control circuit according to claim 8 including a signal smoothing capacitor connected in parallel across the load for reducing the switching risetimes introduced by the switching means.

10. A power control circuit according to claim 8 including an isolating diode and a first capacitor connected in series between the full-wave rectifying node and the point of reference potential for developing a biasing signal for biasing the control and comparing means.

11. A power control circuit according to claim 8 wherein the comparing means comprises a first input for receiving the control signal from the control means and including a second capacitor connected between the first input and the point of reference potential and a switch means selectively operable for establishing a discharge path for the second capacitor.

* * * * *